(12) United States Patent
Choi et al.

(10) Patent No.: US 11,348,588 B2
(45) Date of Patent: May 31, 2022

(54) ELECTRONIC DEVICE AND OPERATION METHOD FOR PERFORMING SPEECH RECOGNITION

(71) Applicant: Samsung Electronics Co., Ltd., Suwon-si (KR)

(72) Inventors: Wonjong Choi, Suwon-si (KR); Soofeel Kim, Suwon-si (KR); Jina Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 16/545,511

(22) Filed: Aug. 20, 2019

(65) Prior Publication Data
US 2020/0058308 A1 Feb. 20, 2020

(30) Foreign Application Priority Data

Aug. 20, 2018 (KR) .................. 10-2018-0096823
Jul. 25, 2019 (KR) .................. 10-2019-0090499

(51) Int. Cl.
| | | |
|---|---|---|
| *G10L 17/22* | (2013.01) | |
| *G10L 17/00* | (2013.01) | |
| *G10L 17/06* | (2013.01) | |
| *G06F 40/295* | (2020.01) | |
| *G10L 15/22* | (2006.01) | |

(52) U.S. Cl.
CPC ............ *G10L 17/00* (2013.01); *G06F 40/295* (2020.01); *G10L 17/06* (2013.01); *G10L 2015/223* (2013.01)

(58) Field of Classification Search
CPC ....... G06F 40/295; G10L 17/00; G10L 17/06; G10L 17/22; G10L 15/22–2015/228
See application file for complete search history.

(56) References Cited

U.S. PATENT DOCUMENTS

| | | | |
|---|---|---|---|
| 6,985,865 B1 | 1/2006 | Packingham et al. | |
| 9,697,822 B1* | 7/2017 | Naik | ........................ G10L 15/22 |
| 10,796,702 B2* | 10/2020 | Li | ........................... G10L 17/22 |
| 2003/0185358 A1* | 10/2003 | Sakamoto | ............... G10L 15/26 |
| | | | 379/102.01 |
| 2013/0179173 A1 | 7/2013 | Lee et al. | |
| 2014/0249817 A1* | 9/2014 | Hart | ........................ G10L 15/22 |
| | | | 704/239 |
| 2018/0166074 A1* | 6/2018 | Aggarwal | ............... G10L 15/02 |
| 2019/0378500 A1* | 12/2019 | Miller | ..................... G06F 3/167 |

* cited by examiner

*Primary Examiner* — Abul K Azad
(74) *Attorney, Agent, or Firm* — Jefferson IP Law, LLP

(57) ABSTRACT

An electronic device for performing speech recognition and a method therefor are provided. The method includes detecting a first text, which is preset for performing speaker recognition, by performing speech recognition on a first speech signal, performing speaker recognition on a second speech signal acquired after the first speech signal, based on the first text being detected, and executing a voice command obtained from the second speech signal, based on a result of performing the speaker recognition on the second speech signal indicating that a speaker of the second speech signal corresponds to a first speaker who registered the first text.

16 Claims, 8 Drawing Sheets

FIG. 4
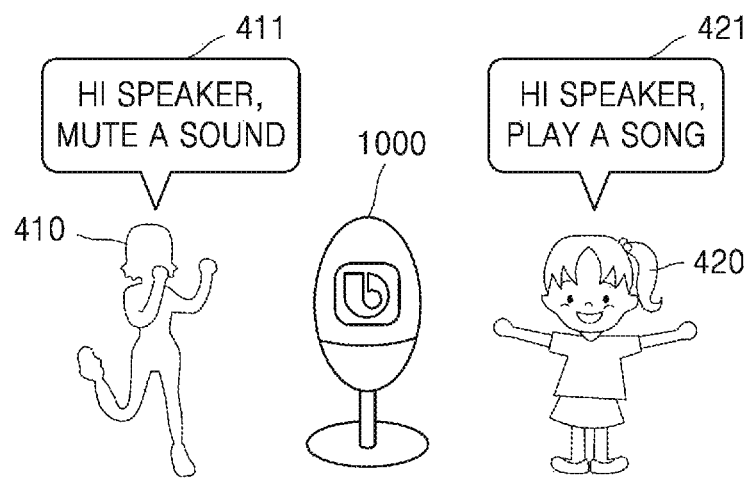
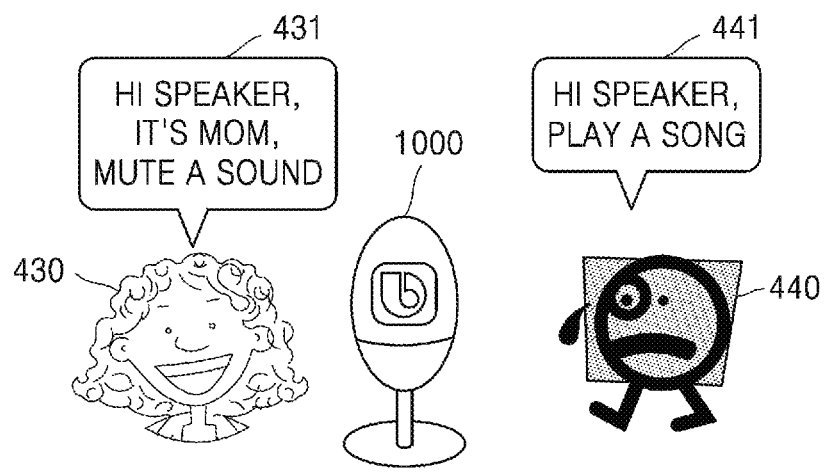

ELECTRONIC DEVICE AND OPERATION METHOD FOR PERFORMING SPEECH RECOGNITION

CROSS-REFERENCE TO RELATED APPLICATION(S)

This application is based on and claims priority under 35 U.S.C. § 119 of a Korean patent application number 10-2018-0096823, filed on Aug. 20, 2018 and Korean patent application number 10-2019-0090499, filed on Jul. 25, 2019, in the Korean Intellectual Property Office, the disclosures of each of which are incorporated by reference herein in their entirety.

BACKGROUND

1. Field

The disclosure relates to electronic devices and operation methods for performing speech recognition.

2. Description of Related Art

Recently, in the field of speech recognition, there has been an increasing demand for research into a speech recognition device for identifying a user's intent from his or her voice command and providing a service desired by the user.

In particular, by using artificial intelligence (AI) techniques, an AI speaker may perform the same roles as an AI secretary by recognizing a user's voice, extracting a command contained in the voice to perform an operation in response to the command, and outputting a result as speech. Furthermore, the AI speaker may identify a speaker and perform a function suitable for the identified speaker by performing speaker recognition as well as speech recognition on a speaker's conversation.

However, when both speech recognition and speaker recognition are performed on all utterances, the amount of computation is excessively increased. Another problem is that the identification of a user by the AI speaker is based on only a user's voice and thus suffers from low accuracy compared to user identification or authentication based on biometric information, such as fingerprint or iris recognition. Thus, in a method of performing speaker recognition together with speech recognition, there is a need for a technique for increasing accuracy of the speaker recognition and reducing the amount of computation.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and operation method for performing speech recognition. Also provided is a computer program product including a computer-readable recording medium having recorded thereon a program for executing the operation method on a computer. The technical problems of the disclosure are not limited to the aforementioned technical features, and other unstated technical problems may be inferred from embodiments below.

Additional aspects will be set forth in part in the description which follows and, in part, will be apparent from the description, or may be learned by practice of the presented embodiments of the disclosure.

In accordance with an aspect of the disclosure, a method of performing speech recognition by an electronic device is provided. The method includes detecting a first text, which is preset for performing speaker recognition, by performing speech recognition on a first speech signal, performing speaker recognition on a second speech signal acquired after the first speech signal, based on the first text being detected, and executing a voice command obtained from the second speech signal, based on a result of performing the speaker recognition on the second speech signal indicating that a speaker of the second speech signal corresponds to a first speaker who registered the first text.

In accordance with another aspect of the disclosure, an electronic device for performing speech recognition is provided. The electronic device includes a microphone configured to receive first and second speech signals, and at least one processor configured to detect a first text, which is preset for performing speaker recognition, by performing speech recognition on the first speech signal, perform speaker recognition on the second speech signal acquired after the first speech signal, based on the first text being detected, and execute a voice command obtained from the second speech signal, based on a result of performing the speaker recognition on the second speech signal indicating that a speaker of the second speech signal corresponds to a first speaker who registered the first text.

In accordance with another aspect of the disclosure, a computer program is provided. The computer program product including a recording medium having stored therein a program for performing the method according to the embodiment of the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates examples of performing speech recognition according to embodiments of the disclosure;

Throughout the drawings, like reference numerals will be understood to refer to like parts, components, and structures.

DETAILED DESCRIPTION

Figure 1:
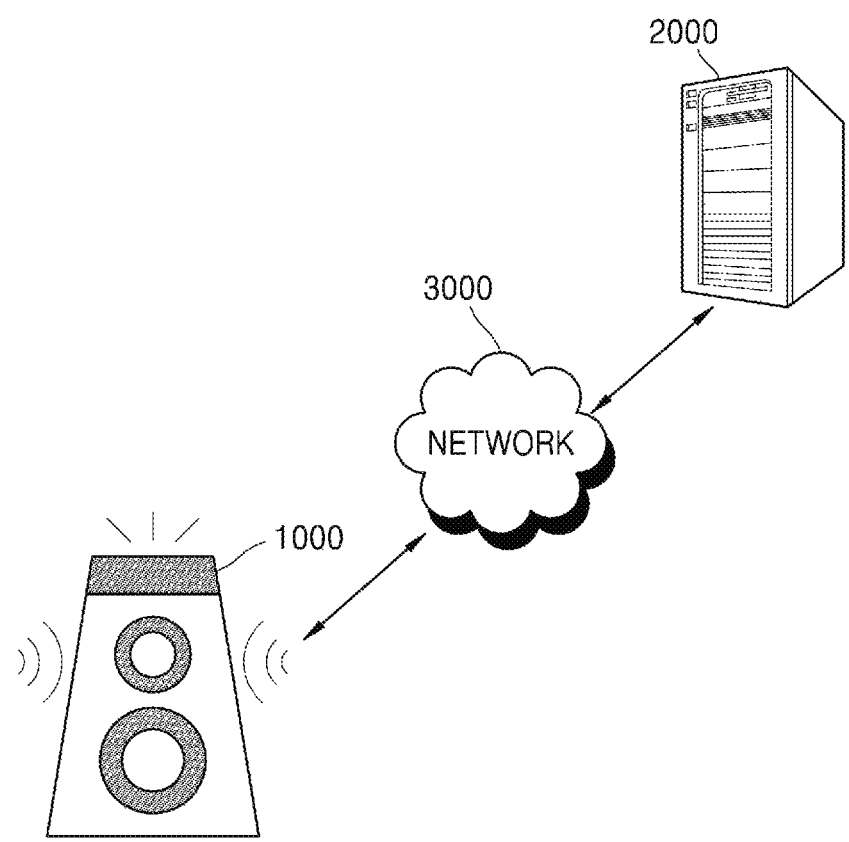
FIG. 1 is a network configuration diagram showing a speech recognition system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected" or "coupled" to another element, it can be directly connected to or electrically coupled to the other element with one or more intervening elements interposed therebetween. When a part "includes" or "comprises" an element, unless there is a particular description contrary thereto, the part can further include other elements, not excluding the other elements.

Throughout the disclosure, the expression "at least one of a, b or c" indicates only a, only b, only c, both a and b, both a and c, both b and c, all of a, b, and c, or variations thereof.

According to the disclosure, functions relate to artificial intelligence (AI) may be performed by a processor and a memory. The processor may be composed of one or more processors. In this case, the one or more processors may be a general-purpose processor such as a central processing unit (CPU), an application processor (AP), or a digital signal processor (DSP), a dedicated graphics processor such as a graphic processing unit (GPU) or vision processing unit (VPU), or a dedicated AI processor such as a neural processing unit (NPU). The one or more processors may control input data to be processed according to predefined operation rules or an AI model stored in the memory. Alternatively, when the one or more processors are a dedicated AI processor, the dedicated AI processor may be designed with a hardware structure specialized for processing a specific AI model.

The predefined operation rules or AI model may be created by a training process. This means that the predefined operation rules or AI model set to perform desired characteristics (or purpose) are created by training a basic AI model with a learning algorithm that utilizes a large number of training data. The training process may be performed by a device for performing AI or a separate server and/or system. Examples of the learning algorithm may include supervised learning, unsupervised learning. semi-supervised learning, and reinforcement learning, but embodiments of the disclosure are not limited thereto.

The AI model may be composed of a plurality of neural network layers. Each of the neural network layers has a plurality of weight values and performs neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network (ANN) may include a deep neural network (DNN) and may be, for example, a convolutional neural network (CNN), a recurrent neural network (RNN), a restricted Boltzmann machine (RBM), a deep belief network (DBN), a bidirectional recurrent DNN (BRDNN), or a deep Q-network (DQN) but is not limited thereto.

Hereinafter, embodiments of the disclosure will be described in detail with reference to the accompanying drawings.

FIG. 1 is a network configuration diagram showing a speech recognition system according to an embodiment of the disclosure.

FIG. 1 illustrates a network environment for a speech recognition system including an electronic device 1000, a server 2000, and a network 3000.

A speech recognition function to be described below refers to the ability of converting a speech signal including a user's voice into a character string (or text). A character string (or text) obtained through conversion from a speech signal by using a speech recognition function may be referred to as a speech recognition result. A user speech signal may include a voice command, and a speech recognition result may also include a command corresponding to the voice command. The voice command may be used to perform a specific function included in the speech recognition system. The voice command and the text obtained as a result of speech recognition may be each a sentence, words, or phrases in the form of a natural language.

Furthermore, throughout the specification, the term "registered" means that a text or speaker is registered, with the speech recognition system, as a user or information related thereto. A "registered user" refers to a user that has completed user registration with the speech recognition system. A person may be registered as a user with the speech recognition system according to the disclosure, and may input his or her voice for user registration.

The electronic device 1000 is an example of a device for performing AI and may be a speech recognition speaker device provided with a voice control function to perform a specific function.

Furthermore, the electronic device 1000 may be implemented as a device for performing a speech recognition function. For example, the electronic device 1000 may be implemented as various devices such as a smart TV, a set-top box, a mobile phone, a tablet PC, a digital camera, a laptop computer, a desktop computer, an electronic book terminal, a digital broadcasting terminal, a personal digital assistant (PDA), a portable multimedia player (PMP), a wearable device, etc. According to an embodiment of the disclosure, the electronic device 1000 is not limited to the above examples and may be implemented as various types of devices capable of performing speech recognition and speaker recognition on a speaker's voice.

According to an embodiment of the disclosure, when a speaker's voice is received, the electronic device 1000 may recognize both a speaker and speech spoken by the speaker, extract a command contained in the voice to perform an operation in response to the command, and output a result as speech.

Furthermore, according to an embodiment of the disclosure, the electronic device 1000 may use one or more trained data recognition models to perform speaker recognition and speech recognition on a received speech signal. For example, the electronic device 1000 may use a data recognition model based on a neural network such as a DNN, a RNN, or the like.

By using a neural network-based data recognition model, the electronic device 1000 may produce speech characteristic data by analyzing a speech signal input via a microphone (1620 of FIG. 2 or 3) and perform speech recognition and speaker recognition based on the speech characteristic data.

According to an embodiment of the disclosure, the speech characteristic data may include information generated by analyzing speech signal characteristics such as a waveform, a frequency, and an amplitude of the speech signal.

The electronic device 1000 may perform speech recognition on a first speech signal by analyzing speech signal characteristics of the first speech signal. For example, the electronic device 1000 may obtain a text corresponding to the first speech signal by using speech signal characteristics corresponding to a prestored text and the analyzed speech signal characteristics. Based on a result of performing the speech recognition, the electronic device 1000 may convert the first speech signal into a character string (or text). After detecting a text pre-registered by the speaker in the character string, the electronic device 1000 may perform speaker recognition on a second speech signal received after the first speech signal in order to recognize the identity of the speaker who pre-registered the text. Otherwise, when the pre-registered text is not detected in the received speech signal, the electronic device 1000 may not perform speaker recognition on the second speech signal received after the first speech signal but extract a speaker's voice command from the second speech signal to perform an operation in response to the voice command.

By analyzing speech signal characteristics of the second speech signal, the electronic device 1000 may determine whether the speaker who utters the second speech signal corresponds to a pre-registered speaker. For example, the electronic device 1000 may determine whether the speaker who utters the second speech signal corresponds to a pre-registered speaker by using speech signal characteristics associated with the pre-registered speaker and speech signal characteristics of the second speech signal.

Before performing speech recognition and speaker recognition according to an embodiment of the disclosure, the electronic device 1000 may store speech signal characteristics associated with the pre-registered speaker by pre-registering the speaker talking to the electronic device 1000. For example, during registration of the speaker, the electronic device 1000 receives a speaker's voice and analyzes the received speaker's voice to prestore speech signal characteristics associated with the speaker. The speech signal characteristics associated with the pre-registered speaker may include information necessary for speaker recognition, such as a waveform, a frequency, an amplitude, etc. of a speech signal from the speaker The electronic device 1000 may obtain and execute a voice command by performing speech recognition on the second speech signal according to a result of performing the speaker recognition. For example, the electronic device 1000 may extract frequency characteristics of a speech signal and perform speech recognition by using an acoustic model and a language model. The electronic device 1000 may convert a speaker's voice in the second speech signal into a character string (or text) and perform natural language processing on the character string (or text) to extract a speaker's voice command included in the second speech signal. A speech recognition result may include the speaker's voice command, and an operation corresponding to the speech recognition result may mean an operation as a response to the speaker's voice command. The electronic device 1000 may extract a command contained in the speaker's voice by a result of performing the speech recognition and perform operations in response to the command according to a result of performing the speaker recognition.

Examples of the operations that are to be performed by the electronic device 1000 in response to the voice command extracted as a result of performing the speech recognition may include providing speech information, music playback, Internet shopping, financial transaction, call connection, message transmission, alarm setting, and control of an electronic or mechanical device connected to the electronic device 1000 via the network 3000.

For example, when the electronic device 1000 is connected to a smart TV via the network 3000, the electronic device 1000 may perform operations including channel watching, channel searching, video playing, program searching, etc. For example, when the electronic device 1000 is connected to a home appliance such as a smart refrigerator, the electronic device 1000 may perform operations including checking of cooling and freezing conditions, temperature setting, etc. However, in the disclosure, the operations that may be performed by the electronic device 1000 are not limited to the above examples.

When performing speaker recognition or an operation in response to a voice command, the electronic device 1000 may generate a synthetic speech signal for reporting a result of the speaker recognition or a result of performing the operation. When a first text is detected in the first speech signal, the electronic device 1000 may generate a synthetic speech signal for reporting that speaker recognition is to be subsequently performed for a first speaker. Furthermore, when it is determined that the speaker who utters the second speech signal is not a speaker who registered the first text and thus an operation corresponding to a speech recognition result is not performed, the electronic device 1000 may generate a synthetic speech signal for reporting that the operation is not performed.

The electronic device 1000 may communicate with an external device (not shown) via the network 3000 by using a wireless or wired communication method.

Communication methods used by the network 3000 are not limited thereto, and may include not only a communication using a communication network (e.g., a mobile communication network, wired Internet, wireless Internet, and a broadcast network) but also a short-range wireless communication with the electronic device 1000. For example, the network 3000 may include one or more networks including a personal area network (PAN), a local area network (LAN), a campus area network (CAN), a metropolitan area network (MAN), a wide area network (WAN), a broadband network (BBN), the Internet, etc. The network 3000 may include any one or more of network topologies including a bus network, a star network, a ring network, a mesh network, a star-bus network, a tree or hierarchical network, etc., but is not limited thereto.

The server 2000 may communicate with the electronic device 1000 via the network 3000 and may be implemented as at least one computer device. The server 2000 may be distributed in a cloud form and may provide commands, codes, files, content, etc. to the electronic device 1000.

The server 2000 may convert a speech signal received from the electronic device 1000 into a character string (or text) to generate a speech recognition result. The server 2000 may synthesize a speech to be reproduced in the electronic device 1000 to generate a synthetic speech signal and transmit the synthetic speech signal to the electronic device 1000.

The server 2000 may perform operations that are to be performed by the electronic device 1000. For example, when the electronic device 1000 performs a function of providing speech information, the server 2000 may recognize an information request included in a speech signal received from the electronic device 1000, generate a result corresponding to the information request, and transmit the result to the electronic device 1000 in the form of a synthetic speech signal. When the electronic device 1000 performs a call connection function, the server 2000 may recognize a call connection request included in a speech signal received from the electronic device 1000, perform a call connection in response to the call connection request, and relay a transmitting signal and a receiving signal during the call connection.

Furthermore, according to an embodiment of the disclosure, the server 2000 may perform speech recognition and speaker recognition that may be performed by the electronic device 1000. For example, the server 2000 may receive from the electronic device 1000 a speech signal interval corresponding to the first text detected based on a result of performing speech recognition on the first speech signal. The server 2000 may perform speaker recognition for recognizing the first speaker who registered the first text with respect to the speech signal interval corresponding to the first text. The server 2000 may transmit a result of performing the speaker recognition to the electronic device 1000. The electronic device 1000 may perform, based on the speaker recognition result received from the server 2000, speaker recognition for recognizing the first speaker with respect to the second speech signal acquired after the first speech signal and execute a voice command extracted from the second speech signal according to a result of performing the speaker recognition.

The server 2000 may be connected to an external device (not shown) via the network 3000, and may control the external device according to a control command included in a speech signal received from the electronic device 1000.

A network for connecting the electronic device 1000 to the server 2000 may be of a different type than a network for connecting the external device to the server 2000. For example, the network for connecting the electronic device 1000 to the server 2000 may be a local area network (LAN) or the Internet, and the network for connecting the external device to the server 2000 may be a mobile communication network.

The external device may be a device that is controllable in response to a voice command received from the electronic device 1000. For example, the external device may be a mobile phone, smartphone, tablet or laptop computer, which may be hand-held by the user, and a home appliance such as a smart TV, personal computer (PC), refrigerator, or washing machine.

Although FIG. 1 shows that the electronic device 1000 is connected to the server 2000 for performing a speech recognition function via the network 3000, this is merely an example, and the electronic device 1000 may independently perform a speech recognition function.

Figure 2:
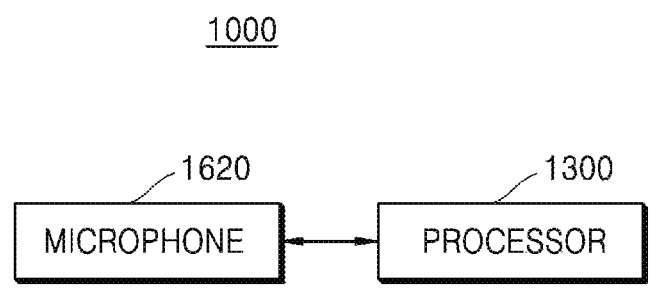
FIG. 2 is block diagram for explaining internal configurations of an electronic device according to embodiments of the disclosure.
Figure 3:
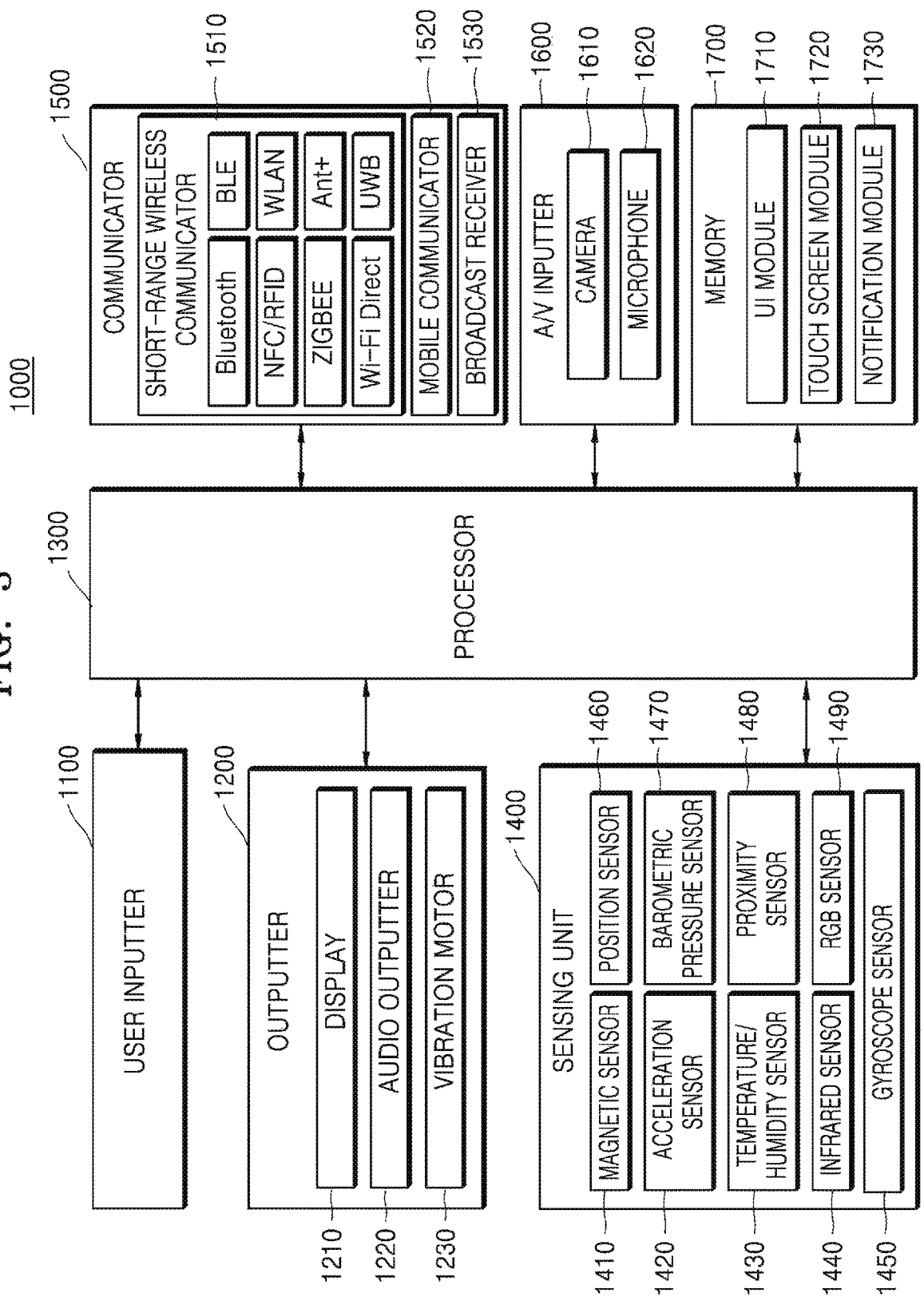
FIG. 3 is block diagram for explaining internal configurations of an electronic device according to embodiments of the disclosure.

FIG. 2 is a block diagram of an internal configuration of an electronic device 1000 according to an embodiment of the disclosure, and FIG. 3 is a detailed block diagram of an internal configuration of an electronic device 1000 according to an embodiment of the disclosure.

Referring to FIG. 2, the electronic device 1000 may include a processor 1300 and a microphone 1620. However, all the components shown in FIG. 2 are not essential components of the electronic device 1000. The electronic device 1000 may include more or fewer components than those shown in FIG. 2.

For example, referring to FIG. 3, according to some embodiments of the disclosure, the electronic device 1000 may include a camera 1610, a memory 1700, a display 1210, and a processor 1300. The electronic device 1000 may further include a user inputter 1100, a communicator 1500 (e.g., a transceiver), an outputter 1200, a sensing unit 1400, and an audio/video (A/V) inputter 1600.

The user inputter 1100 is a device via which the user inputs data necessary for controlling the electronic device 1000. Examples of the user inputter 1100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

According to an embodiment of the disclosure, the user inputter 1100 may receive a user input for performing speech recognition.

The outputter 1200 may output an audio signal, a video signal, or a vibration signal. The outputter 1200 may include a display 1210, an audio outputter 1220, and a vibration motor 1230.

The display 1210 may display and output information processed by the electronic device 1000. According to an embodiment of the disclosure, the display 1210 may output results of performing speaker recognition and speech recognition.

In addition, when the display 1210 and a touch pad form a layer structure to form a touch screen, the display 1210 may be used as an input device as well as an output device. The display 1210 may include at least one of a liquid crystal display (LCD), a thin-film-transistor-LCD (TFT-LCD), an organic light-emitting diode (OLED), a flexible display, a three-dimensional (3D) display, or an electrophoretic display. Furthermore, the electronic device 1000 may include two or more displays 1210 according to its implemented configuration.

The audio outputter 1220 may output audio data received from the communicator 1500 or stored in the memory 1700. According to an embodiment of the disclosure, the audio outputter 1220 may output as a synthetic speech sound a character string representing the results of performing the speaker recognition and speech recognition. For example, when a preset text is detected as a speech recognition result, the audio outputter 1220 may output a character string indicating that speaker recognition is to be performed as a synthetic speech sound. Furthermore, after the speech recognition and the speaker recognition are performed, the audio outputter 1220 may output a character string indicating a result of executing a voice command as a synthetic speech sound.

The vibration motor 1230 may output a vibration signal. Furthermore, the vibration motor 1230 may output a vibration signal when a touch is input on a touch screen. According to an embodiment of the disclosure, the vibration motor 1230 may output a vibration signal for indicating that speech recognition and speaker recognition are to be performed.

The processor 1300 controls all operations of the electronic device 1000. For example, the processor 1300 may control the user inputter 1100, the outputter 1200, the sensing unit 1400, the communicator 1500, and the A/V inputter 1600 in its entirety by executing programs stored in the memory 1700. The electronic device 1000 may include at least one processor 1300.

The processor 1300 may be configured to process instructions of a computer program by performing basic arithmetic, logic, and input/output operations. A command may be provided from the memory 1700 to the processor 1300 or may be received via the communicator 1500 and provided to the processor 1300. For example, the processor 1300 may be configured to execute instructions according to program code stored in a recording device such as the memory 1700.

According to an embodiment of the disclosure, the processor 1300 may acquire first and second speech signals corresponding to a speaker's voice based on audio signals produced by the microphone 1620. The second speech signal may be acquired after the first speech signal. The processor 1300 may perform speaker recognition on the second speech signal, when a first text preset for performing speaker recognition is detected by a result of performing speech recognition on the first speech signal. According to an embodiment of the disclosure, the processor 1300 may perform speaker recognition on the second speech signal only when a result of performing speaker recognition on the speech signal interval indicates that a speaker of a speech signal interval in which a first text is uttered corresponds to a first speaker who registered the first text. When a result of performing the speaker recognition on the second speech signal indicates that a speaker of the second speech signal corresponds to the first speaker, the processor 1300 may execute a voice command extracted from the second speech signal.

Otherwise, when a result of performing the speaker recognition on the second speech signal indicates that the speaker of the second speech signal does not correspond to the first speaker, the processor 1300 may ignore the voice command extracted from the second speech signal.

Furthermore, the processor 1300 may detect a plurality of preset texts in a speech signal and perform speaker recognition for a plurality of speakers respectively corresponding to the preset texts. The processor 1300 may execute, based on the order of priority for the speakers, a voice command extracted from a speech signal corresponding to each speaker. For example, when a second text is detected by performing speech recognition on a third speech signal acquired after the first speech signal, the processor 1300 may perform speaker recognition on a fourth speech signal acquired after the third speech signal. When a result of the speaker recognition indicates that a speaker of the fourth speech signal corresponds to a second speaker who registered the second text, the processor 1300 may determine the order of priority for the second speaker and the first speaker who registered the first text extracted from the first speech signal. When the first speaker has a higher priority than the second speaker, the processor 1300 may not execute a voice command extracted from the fourth speech signal. Otherwise, when the second speaker has a higher priority than the first speaker, the processor 1300 may execute the voice command extracted from the fourth speech signal.

The sensing unit 1400 may detect a status of the electronic device 1000 or the surroundings thereof and transmit information about the detected status to the processor 1300.

The sensing unit 1400 may include at least one of a magnetic sensor 1410, an acceleration sensor 1420, a temperature/humidity sensor 1430, an infrared sensor 1440, a gyroscope sensor 1450, a position sensor (e.g., GPS) 1460, a barometric pressure sensor 1470, a proximity sensor 1480, or an RGB (red, green, and blue) sensor (an illuminance sensor) 1490, but is not limited thereto.

The communicator 1500 may include one or more components that enable the electronic device 1000 to communicate with the server (2000 of FIG. 1) or an external device (not shown). For example, the communicator 1500 may include a short-range wireless communicator 1510, a mobile communicator 1520 (e.g., a mobile transceiver), and a broadcast receiver 1530.

The short-range wireless communicator 1510 (e.g., a short-range transceiver) may include a Bluetooth communication module, a Bluetooth Low Energy (BLE) communication module, a Near Field Communication (NFC) module, a wireless local area network (WLAN) or Wi-Fi communication module, a Zigbee communication module, an Infrared Data Association (IrDA) communication module, a Wi-Fi Direct (WFD) communication module, an Ultra-wideband (UWB) communication module, and an Ant+ communication module, but is not limited thereto.

The mobile communicator 1520 transmits or receives a wireless signal to or from at least one of a base station, an external terminal, or a server on a mobile communication network. In this case, the wireless signal may be a voice call signal, a video call signal, or data in any one of various formats according to transmission and reception of a text/multimedia message.

The broadcast receiver 1530 receives broadcast signals and/or broadcast-related information from the outside via a broadcast channel. The broadcast channel may include a satellite channel and a terrestrial channel. According to an embodiment of the disclosure, the electronic device 1000 may not include the broadcast receiver 1530.

According to an embodiment of the disclosure, the communicator 1500 may receive results of speech recognition and speaker recognition, which are transmitted by the server 2000, or receive a speech signal transmitted by the external device.

The A/V inputter 1600 for inputting an audio or video signal may include the camera 1610, the microphone 1620, etc. The camera 1610 may acquire an image frame such as a still or moving image via an image sensor in a video call mode or capture mode. An image captured through the image sensor may be processed by the processor 1300 or a separate image processor (not shown).

The microphone 1620 may receive an external acoustic signal and process the acoustic signal as electrical speech data. For example, the microphone 1620 may receive a speaker's speech signal. As another example, the microphone 1620 may receive a speech signal including utterances by a plurality of speakers.

The memory 1700 may store programs necessary for processing or control operations performed by the processor 1300 or store data input to or output from the electronic device 1000. According to an embodiment of the disclosure, the memory 1700 may store information necessary for speaker recognition, such as information necessary for recognizing a pre-registered speaker from a speech signal. Furthermore, the memory 1700 may store information necessary for speech recognition, such as an acoustic model, a language model, etc.

According to an embodiment of the disclosure, when speaker recognition and speech recognition are performed by the server 2000, information necessary for the speaker recognition and the speech recognition may be stored in the server 2000 instead of the memory 1700.

The memory 1700 may include at least one type of storage medium, for example, a flash memory-type memory, a hard disk-type memory, a multimedia card micro-type memory, a card-type memory (e.g., an SD card or an XD memory), random access memory (RAM), static RANI (SRAM), read-only memory (ROM), electrically erasable programmable ROM (EEPROM), PROM, a magnetic memory, a magnetic disc, or an optical disc.

Programs stored in the memory 1700 may be classified into a plurality of modules according to their functions. For example, the programs may be classified into a user interface (UI) module 1710, a touch screen module 1720, and a notification module 1730.

The UI module 1710 may provide a specialized UI, a GUI, etc. interworking with the electronic device 1000 for each application. The touch screen module 1720 may detect a user's touch gesture on a touch screen and transmit information about the detected touch gesture to the processor 1300. According to some embodiments of the disclosure, the touch screen module 1720 may recognize and analyze a touch code. The touch screen module 1720 may be formed by separate hardware components including a controller.

Various sensors may be positioned within or near the touch screen so as to sense a touch or proximity touch on the touch screen. A tactile sensor is an example of the sensors for sensing a touch on the touch screen. The tactile sensor is used to sense a touch of a particular object to the same or greater degree than the degree to which a human can sense the touch. The tactile sensor may detect various pieces of information including the roughness of a contact surface, rigidity of a contact object, and the temperature of a contact point.

A user's touch gesture may include tap, touch and hold, double-tap, drag, panning, flick, drag and drop, swipe, etc.

The notification module 1730 may generate a signal for notifying the occurrence of an event in the electronic device 1000.

FIG. 4 illustrates an example of performing speech recognition according to an embodiment of the disclosure.

According to an embodiment of the disclosure, an electronic device 1000 for performing speech recognition may be installed fixedly in a specific space to simultaneously receive speeches uttered by a plurality of speakers.

Reference element 401 of FIG. 4 shows an example in which speech recognition is performed without speaker recognition, according to an embodiment of the disclosure, and reference element 402 shows an example in which speech recognition is performed based on speaker recognition, according to an embodiment of the disclosure.

Referring to reference element 401 of FIG. 4, the electronic device 1000 for performing speech recognition according to an embodiment of the disclosure may perform speech recognition by receiving utterances by the first speaker 410 and the second speaker 420 For example, the electronic device 1000 may perform speech recognition on a first utterance 411 by the first speaker 410 and a second utterance 421 by the second speaker 420. As a result of performing the speech recognition, the electronic device 1000 may respectively obtain "Hi Speaker, mute a sound" and "Hi Speaker, play a song" as texts respectively corresponding to the first and second utterances 411 and 421.

As the first and second speakers 410 and 420 respectively utter voice commands, each including the hotword "Hi Speaker", the electronic device 1000 may perform speech recognition on speech uttered after the hotword "Hi Speaker". A hotword refers to a specific word or phrase that may be spoken by a user to invoke the electronic device 1000 before a user's utterance of a voice command.

After recognizing "Hi Speaker" that is a predefined hotword from the first utterance 411 by performing speech recognition, the electronic device 1000 may obtain "mute a sound" that is speech uttered after "Hi Speaker" as a voice command. Similarly, the electronic device 1000 may obtain "play a song" as a voice command after recognizing "Hi Speaker" from the second utterance 421 via speech recognition. The electronic device 1000 may perform operations in response to the obtained voice commands.

However, according to the example shown in 401 of FIG. 4, when the words "mute a sound" and "play a song" respectively spoken by the first and second speakers 410 and 420 are both obtained as voice commands, the words "mute a sound" and "play a song" that are contradictory voice commands may be processed together.

On the other hand, according to the example shown in reference element 402 of FIG. 4, as speaker recognition is performed, the voice command uttered by a third speaker 430 who is a pre-registered speaker may be processed preferentially to the voice command uttered by a fourth speaker 440.

Referring to reference element 402 of FIG. 4, the electronic device 1000 for performing speech recognition according to an embodiment of the disclosure may perform speech recognition by receiving third and fourth utterances 431 and 441 respectively spoken by the third and fourth speakers 430 and 440. For example, the electronic device 1000 may perform speech recognition on the third utterance 431 by the third speaker 430 and the fourth utterance 441 by the fourth speaker 440. As a result of performing the speech recognition, the electronic device 1000 may respectively obtain "Hi Speaker, it's mom, mute a sound" and "Hi Speaker, play a song" as texts respectively corresponding to the third and fourth utterances 431 and 441. According to an embodiment of the disclosure, after receiving an utterance of "it's mom" included in the third utterance 431, the electronic device 1000 may receive the following words "mute a sound" in the third utterance 431 and "Hi Speaker, play a song" in the fourth utterance 441.

After "it's mom" that is a pre-registered text is recognized in the third utterance 431 by the third speaker 430 as a result of performing the speech recognition, the electronic device 1000 may perform both speech recognition and speaker recognition on the subsequently received utterances "mute a sound" and "Hi Speaker, play a song". Thus, the electronic device 1000 may process "mute a sound" that is a voice command uttered by the third speaker 430 who registered "it's mom" preferentially to "Hi Speaker, play a song" that is a voice command uttered by the fourth speaker 440.

According to an embodiment of the disclosure, the electronic device 1000 may perform only speech recognition on an input speech signal without performing speaker recognition and then recognize the pre-registered text "it's mom" as a result of the speech recognition. The electronic device 1000 may perform both speaker recognition and speech recognition on a speech signal received during a preset time interval after recognizing "it's mom". The electronic device 1000 may determine whether the received speech signal is an utterance by the third speaker 430 who registered "it's mom". As a result of the speaker recognition, the electronic device 1000 may process "mute a sound" that is the voice command uttered by the third speaker 430. Furthermore, as a result of the speaker recognition, the electronic device 1000 may not process "play a song" that is the voice command uttered by the fourth speaker 430.

Figure 5:
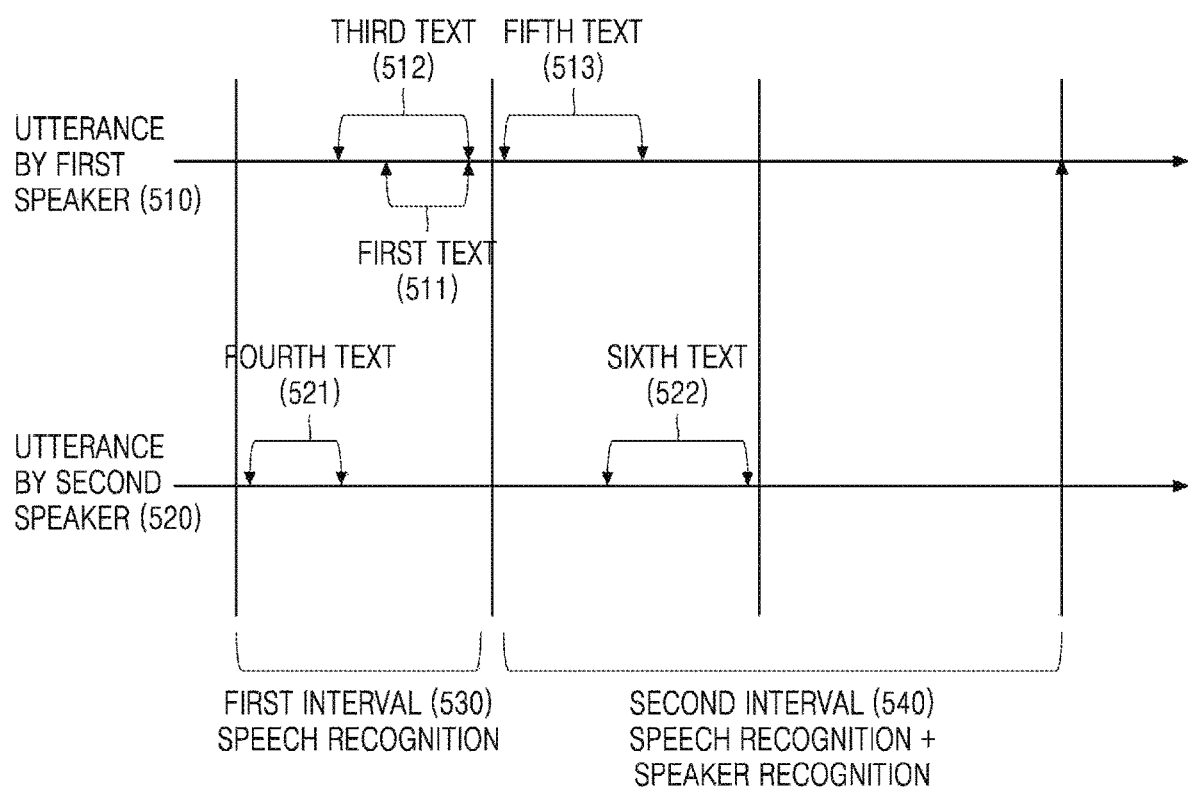
FIG. 5 illustrates examples of performing speech recognition according to embodiments of the disclosure.

FIG. 5 illustrates an example of performing speech recognition according to an embodiment of the disclosure.

Referring to FIG. 5, the electronic device 1000 may receive a speech signal including an utterance 510 by a first speaker and an utterance 520 by a second speaker. In FIG. 5, an interval indicated by arrows represents a speech signal interval during which the first or second speaker utters a speech signal.

Speech signals of FIG. 5 may include the utterances 510 and 520 respectively spoken by the first and second speakers. For example, a first speech signal may include the utterances 510 and 520 respectively spoken by the first and second speaker in a first interval 530. Furthermore, a second speech signal may include the utterances 510 and 520 respectively spoken by the first and second speaker in a second interval 540.

The electronic device 1000 may perform speech recognition on the first speech signal acquired in the first interval 530. Third and fourth texts 512 and 521 respectively corresponding to the utterances 510 and 520 by the first and second speakers may be obtained as a result of performing the speech recognition on the first speech signal acquired in the first interval 530. After a first text 511 that is a pre-registered text is detected from the third text 512, the electronic device 1000 may perform both speech recognition and speaker recognition on the second speech signal acquired in the second interval 540.

For example, after the first text 511 is detected, speaker recognition may be performed for the first speaker who registered the first text 511. After the first text 511 is detected, the electronic device 1000 may acquire information necessary to perform speaker recognition for the first speaker.

Furthermore, when the first text 511 that is the pre-registered text is detected in the third text 512, the electronic device 1000 may perform speaker recognition for recognizing the first speaker on a speech signal interval in which the first text 511 is uttered. According to a result of the speaker recognition on the speech signal interval, the electronic device 1000 may determine whether to perform, together with speech recognition, the speaker recognition for recognizing the first speaker with respect to a speech signal acquired in the second interval 540.

When it is determined, as a result of the speaker recognition, that the first text 511 is uttered by the first speaker, the electronic device 1000 may perform both speech recognition and speaker recognition on the second speech signal acquired in the second interval 540. On the other hand, when it is determined that the first text 511 is not uttered by the first speaker, the electronic device 1000 may perform only speech recognition on the second speech signal acquired in the second interval 540 without performing speaker recognition thereon.

The second interval 540 during which both speaker recognition for the first speaker and speech recognition are performed may be set as a preset time interval following acquisition of a speech signal in the first interval 530. The second interval 540 is not limited to the above example and may be set in various ways.

When it is determined that both speech recognition and speaker recognition are performed on the second speech signal acquired in the second interval 540, the electronic device 1000 may perform both speech recognition and speaker recognition on the utterances 510 and 520 by the first and second speakers, which are acquired during the second interval 540. A fifth text 513 and a sixth text 522 may be obtained by a result of performing the speech recognition. The electronic device 1000 may determine that the fifth text 513 is uttered by the first speaker by performing the speaker recognition. Thus, the electronic device 1000 may extract a voice command from the first text 513 and perform an operation in response to the extracted voice command. Furthermore, because it is determined, as a result of performing the speaker recognition, that the sixth text 522 is not uttered by the first speaker, the electronic device 1000 may ignore a voice command corresponding to the sixth text 522 without executing the voice command.

Figure 6:
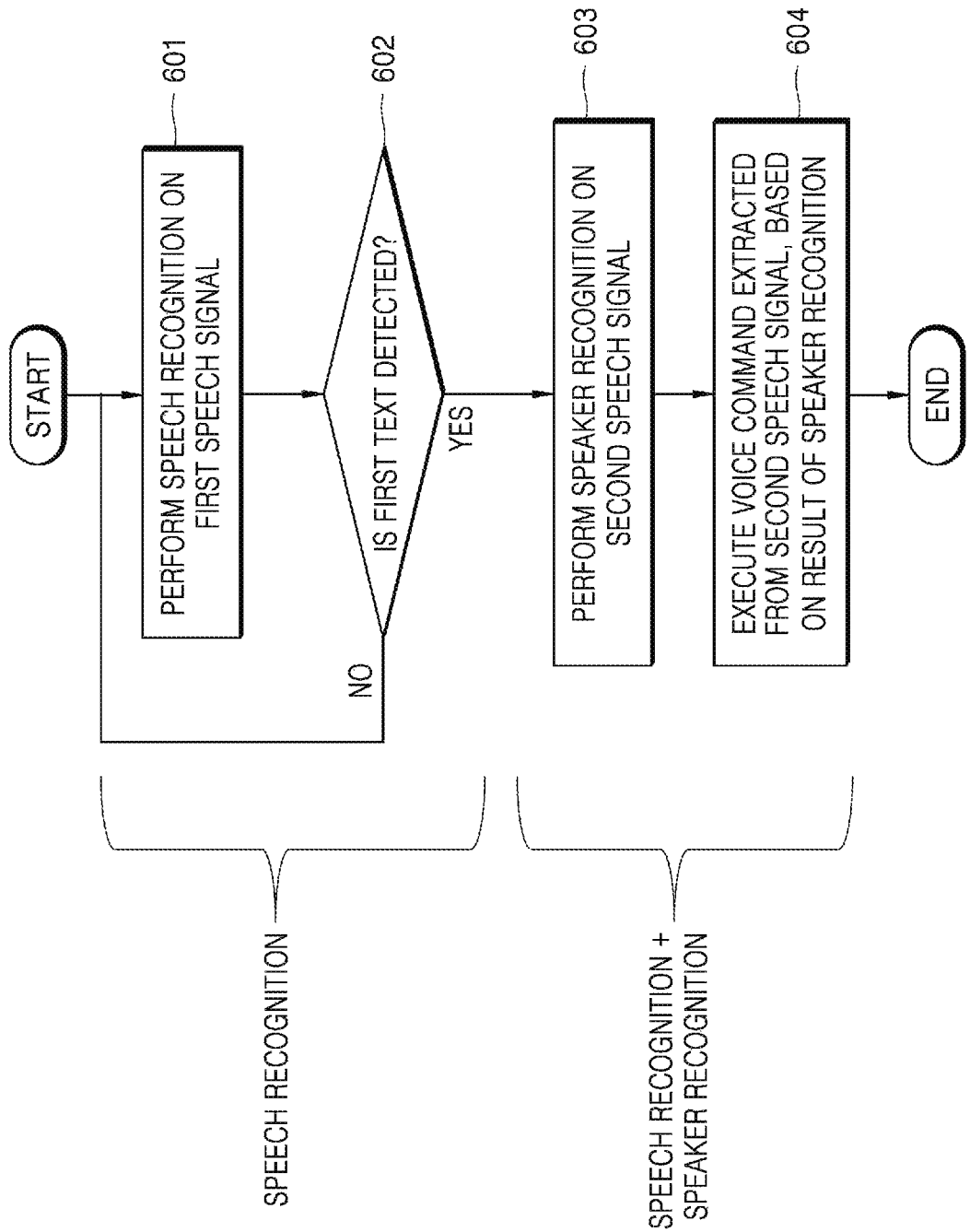
FIG. 6 is flowchart of methods of performing speech recognition according to embodiments of the disclosure.

FIG. 6 is a flowchart of a method of performing speech recognition according to an embodiment of the disclosure.

Referring to FIG. 6, the electronic device 1000 may perform speech recognition on a first speech signal (operation 601). The electronic device 1000 may obtain a text corresponding to the first speech signal as a result of the speech recognition.

As a result of performing the speech recognition in operation 601, the electronic device 1000 may detect a first text preset for performing speaker recognition in a text corresponding to the first speech signal (operation 602).

The first text may be pre-registered by a first speaker with the electronic device 1000 in order to perform speaker recognition. For example, the first text may include a word or phrase indicating a first speaker's identity, name, nickname, etc.

By receiving a speech that is an utterance of the first text from the first speaker, the electronic device 1000 may set the first text as a text for speaker recognition.

The electronic device 1000 may detect the first text by performing named entity recognition on a text obtained by performing speech recognition on the first speech signal. Named entity recognition refers to a technique for recognizing a named entity corresponding to a predefined person, company, location, time expression, unit, or the like in a certain text and adding a tag to the recognized named entity. For example, the electronic device 1000 may recognize a named entity corresponding to a predefined person in a text and add a tag representing the predefined person to the recognized named entity.

According to an embodiment of the disclosure, by performing named entity recognition, the electronic device 1000 may extract a named entity representing the pre-registered first speaker from a text corresponding to the first speech signal. The named entity representing the first speaker, which is to be extracted via named entity recognition, may be pre-trained using AI technology.

According to an embodiment of the disclosure, the electronic device 1000 may use trained one or more data recognition models to perform named entity recognition on a text obtained as a speech recognition result.

According to an embodiment of the disclosure, the electronic device 1000 may use a data recognition model based on a neural network such as a DNN, a RNN, etc.

The electronic device 1000 may perform named entity recognition on a text obtained as a speech recognition result by using one or more data recognition models based on a neural network. For example, the electronic device 1000 may use a data recognition model to determine whether a named entity representing the pre-registered first speaker is contained in the text for speaker recognition.

When the named entity representing the pre-registered first speaker is extracted from the text, the named entity may be detected as the first text.

Otherwise, when the preset first text is not detected as a result of performing the speech recognition, the electronic device 1000 may perform only speech recognition on a subsequently acquired speech signal like in operation 601.

When the first text is detected in operation 602, the electronic device 1000 may perform speaker recognition on a second speech signal acquired after the first speech signal (operation 603). According to an embodiment of the disclosure, the second speech signal undergoing the speech recognition may include a speech signal acquired during a preset time period after acquisition of the first speech signal.

When a result of performing the speaker recognition in operation 603 indicates that a speaker of the second speech signal corresponds to a first speaker who registered the first text, the electronic device 1000 may execute a voice command extracted from the second speech signal (operation 604). Otherwise, when the speaker of the second speech signal does not correspond to the first speaker, the electronic device 1000 may ignore the voice command extracted from the second speech signal.

Furthermore, the electronic device 1000 may detect a plurality of preset texts in a speech signal and perform speaker recognition on a plurality of speakers respectively corresponding to the preset texts. The electronic device 1000 may execute, based on the order of priority for the speakers, a voice command extracted from a speech signal corresponding to each speaker. For example, when a second text is detected by performing speech recognition on a third speech signal acquired after the first speech signal, speaker recognition may be performed on a fourth speech signal acquired after the third speech signal. When a result of the speaker recognition indicates that a speaker of the fourth speech signal corresponds to a second speaker who registered the second text, the electronic device 1000 may determine the order of priority for the second speaker and the first speaker who registered the first text extracted from the first speech signal. When the first speaker has a higher priority than the second speaker, the electronic device 1000 may not execute a voice command extracted from the fourth speech signal. Otherwise, when the second speaker has a higher priority than the first speaker, the electronic device 1000 may execute the voice command extracted from the fourth speech signal.

Figure 7:
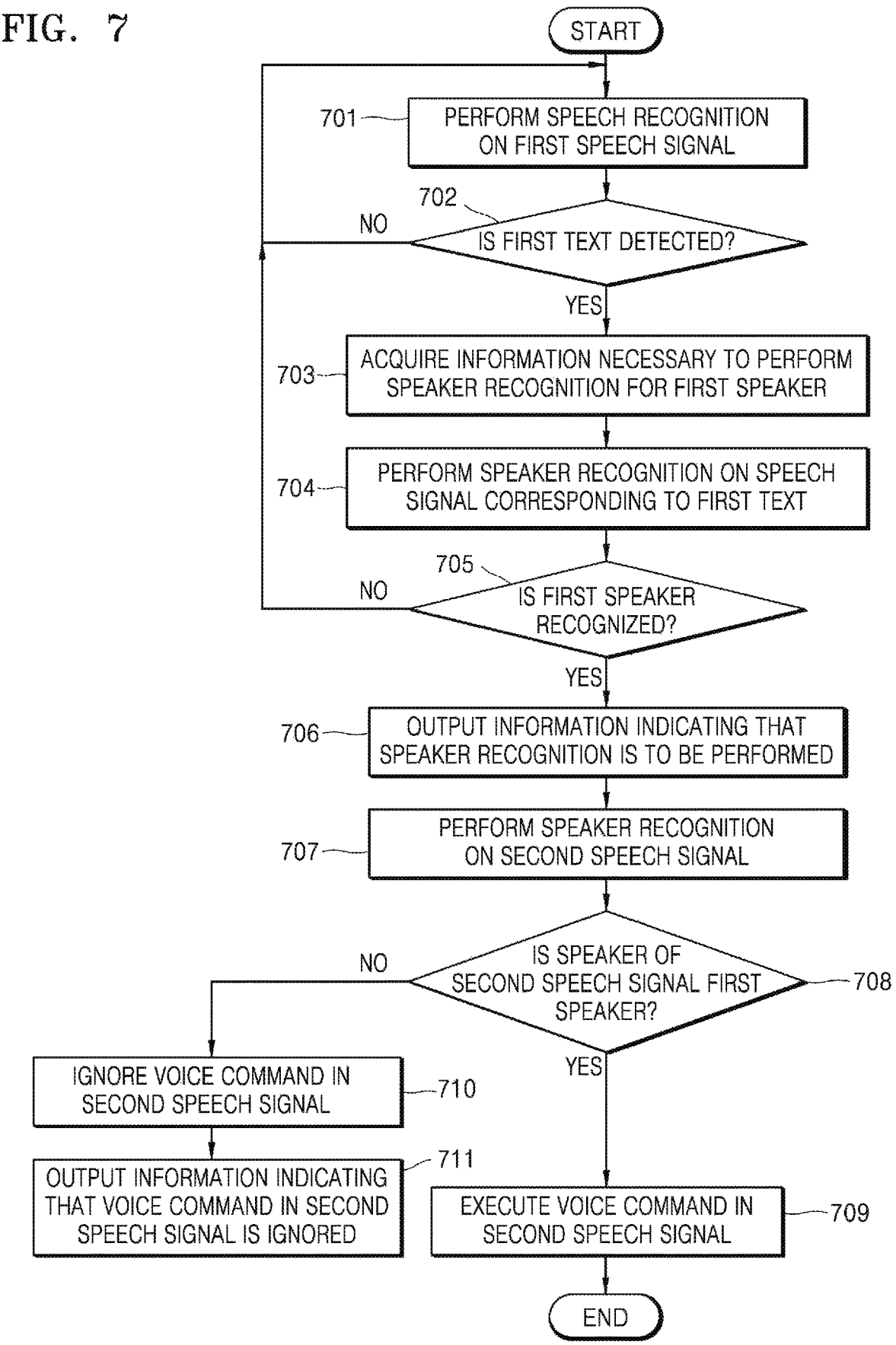
FIG. 7 is flowchart of methods of performing speech recognition according to embodiments of the disclosure.

FIG. 7 is a flowchart of a method of performing speech recognition according to an embodiment of the disclosure.

Operations 701, 702, 707 of FIG. 7 may respectively correspond to 601, 602, and 603 of FIG. 6.

Referring to FIG. 7, the electronic device 1000 may perform speech recognition on a first speech signal (operation 701). The electronic device 1000 may obtain a text corresponding to the first speech signal as a result of the speech recognition.

As a result of performing the speech recognition in operation 701, the electronic device 1000 may detect a first text preset for performing speaker recognition in a text corresponding to the first speech signal (operation 702). The first text may be pre-registered by a first speaker. Furthermore, the first text may be detected via named entity recognition.

The electronic device 1000 may acquire information necessary to perform speaker recognition for a first speaker who registered the first text (operation 703). The information necessary to perform the speaker recognition for the first speaker may include information collected when the first speaker registers the first text. Furthermore, the information necessary to perform the speaker recognition for the first speaker may include information pre-trained based on speech information of the first speaker by using AI technology.

The electronic device 1000 may perform speaker recognition on a speech signal corresponding to the first text (operation 704). For example, the electronic device 1000 may acquire a speech signal interval in which the first text is uttered based on the first speech signal and perform speaker recognition on the speech signal interval.

The electronic device 1000 may determine whether a speaker uttering the first text corresponds to the first speaker as a result of performing the speaker recognition in operation 704 (operation 705). The electronic device 1000 may perform speaker recognition by using the information necessary to perform speaker recognition for the registered first speaker.

For example, the electronic device 1000 may extract feature information regarding speech in the speech signal interval in which the first text is uttered. The electronic device 1000 may perform speaker recognition by comparing the extracted feature information with prestored feature information regarding the first speaker. When the degree of correspondence between the feature information regarding the speech signal interval during which the first text is uttered and the feature information regarding the first speaker is greater than or equal to a first reference value, the electronic device 1000 may determine that the speaker uttering the first text corresponds to the first speaker.

When it is determined, as a result of performing the speaker recognition, that the speaker uttering the first text corresponds to the first speaker, the electronic device 1000 may output information indicating that speaker recognition is to be performed (operation 706). For example, the electronic device 1000 may output via a speaker a synthetic speech sound indicating that the speaker recognition is to be performed. A speaker of the second speech signal acquired after the first speech signal may recognize, based on the information output by the electronic device 1000, that the speaker recognition is to be performed.

Otherwise, when it is determined, as a result of performing the speaker recognition, that the speaker uttering the first text does not correspond to the first speaker, the electronic device 1000 may perform speech recognition on a speech signal acquired after the first speech signal without performing speaker recognition thereon.

The electronic device 1000 may perform speaker recognition on a second speech signal acquired after the first speech signal (operation 707). For example, the electronic device 1000 may extract feature information regarding speech in the second speech signal. The electronic device 1000 may perform speaker recognition by comparing the extracted feature information with prestored feature information regarding the first speaker. When the degree of correspondence between the feature information regarding the speech in the second speech signal and the feature information regarding the first speaker is greater than or equal to a second reference value, the electronic device 1000 may determine that the speaker of the second speech signal corresponds to the first speaker.

According to an embodiment of the disclosure, when it is determined that speaker recognition is performed for recognizing a speaker specified by detection of the first text, the speaker recognition is performed only for the specified speaker. Thus, the electronic device 1000 is able to perform speaker recognition with high accuracy.

The first reference value used in the speaker recognition in operation 704 and the second reference value used in the speaker recognition in operation 707 may be preset values and may be both set to different values. For example, the first reference value may be set to be less than the second reference value. Thus, the speaker recognition in operation 707 may be performed with higher accuracy than the speaker recognition in operation 704. The electronic device 1000 may use a greater reference value for the speaker recognition in operation 707 than for the speaker recognition in operation 704

When a result of performing the speaker recognition on the second speech signal indicates that the speaker of the second speech signal corresponds to the first speaker who registered the first text in operation 708, the electronic device 1000 may execute a voice command extracted from the second speech signal (operation 709). For example, the electronic device 1000 may extract a text by a result of performing speech recognition on the second speech signal and obtain a voice command that matches a user's intent based on the extracted text.

Otherwise, when a result of performing the speaker recognition on the second speech signal indicates that the speaker of the second speech signal does not correspond to the first speaker who registered the first text in operation 708, the electronic device 1000 may ignore a voice command extracted from the second speech signal without executing the voice command (operation 710). Alternatively, when a result of performing the speaker recognition indicates that the speaker of the second speech signal does not correspond to the first speaker who registered the first text, the electronic device 1000 may ignore and not perform speech recognition on the second speech signal.

According to an embodiment of the disclosure, when the voice command in the second speech signal is ignored as a result of performing the speaker recognition, the electronic device 1000 may count the time for determine whether to continuously perform speaker recognition for the first speaker. When a speech signal determined as an utterance by the first speaker is not acquired within a preset time period, as a result of performing the speaker recognition, the electronic device 1000 may not perform speaker recognition for the first speaker with respect to a subsequently acquired speech signal. The electronic device 1000 may perform operations following the operation 701 on the subsequently acquired speech signal.

The electronic device 1000 may output information indicating that the voice command in the second speech signal is ignored (operation 711). For example, the electronic device 1000 may output via a speaker a synthetic speech sound indicating that the voice command in the second speech signal is ignored. The speaker of the second speech signal acquired after the first speech signal may recognize, based on the information output by the electronic device 1000, that the voice command uttered by the speaker himself/herself is ignored.

Figure 8:
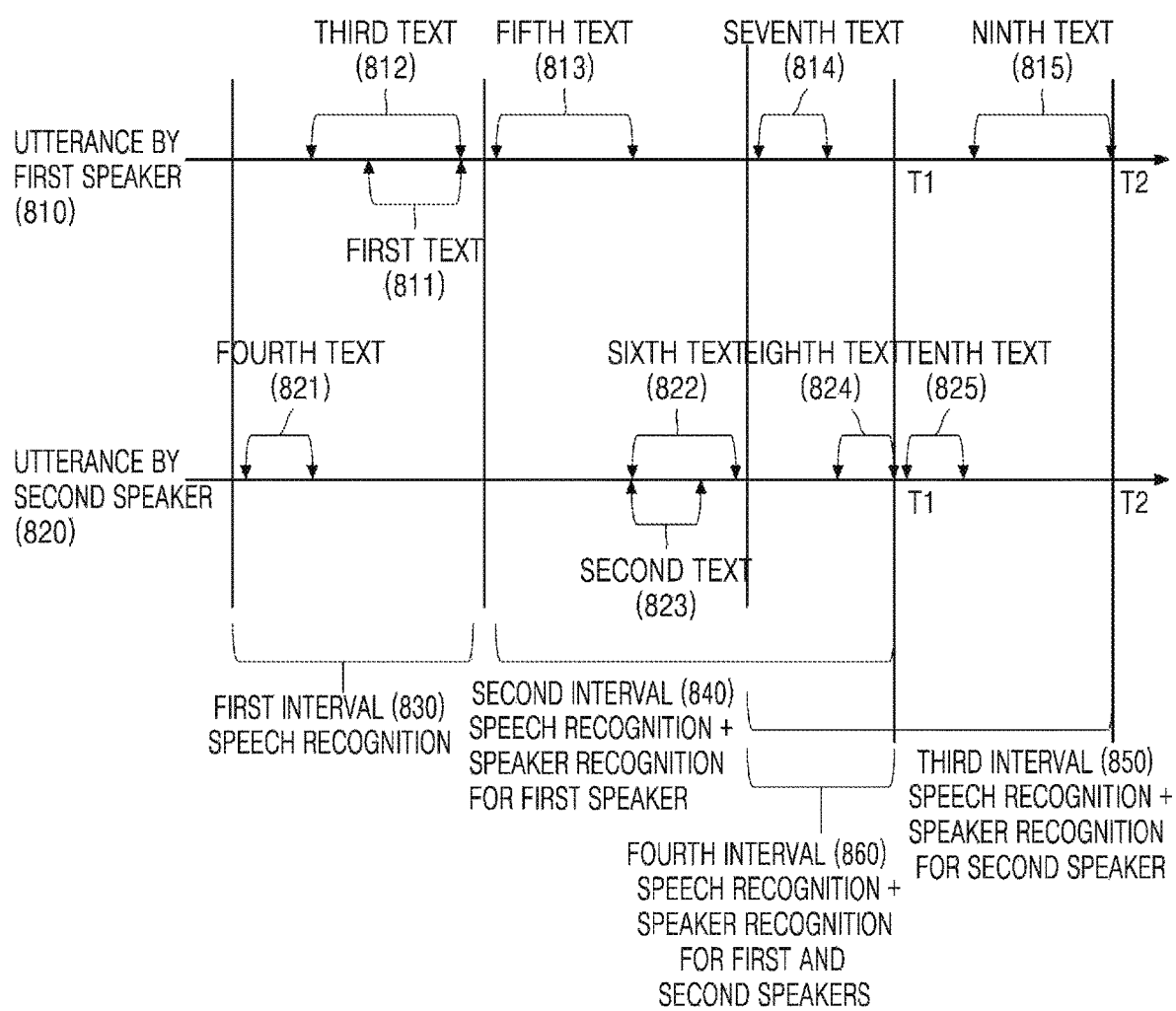
FIG. 8 illustrates an example of performing speech recognition on a speech signal including utterances spoken by a plurality of speakers, according to an embodiment of the disclosure.

FIG. 8 illustrates an example of performing speech recognition on a speech signal including utterances spoken by a plurality of speakers, according to an embodiment of the disclosure.

Referring to FIG. 8, the electronic device 1000 may receive a speech signal including an utterance 810 by a first speaker and an utterance 820 by a second speaker. An interval indicated by arrows represents a speech signal interval during which the first or second speaker utters a speech signal.

A speech signal acquired in each interval may include the utterances 810 and 820 respectively spoken by the first and second speakers.

The electronic device 1000 may perform speech recognition on speech signals acquired in a first interval 830. Third and fourth texts 812 and 821 respectively corresponding to the utterances 810 and 820 by the first and second speakers may be obtained as a result of performing the speech recognition on the first speech signal acquired in the first interval 830. After a first text 811 that is a pre-registered text is detected in the third text 812, the electronic device 1000 may perform both speech recognition and speaker recognition for the first speaker with respect to a second speech signal acquired in the second interval 840.

For example, after the first text 811 is detected, speaker recognition may be performed for the first speaker who registered the first text 811. After the first text 811 is detected, the electronic device 1000 may acquire information necessary to perform speaker recognition for the first speaker.

Furthermore, when the first text 811 that is the pre-registered text is detected in the third text 812, the electronic device 1000 may perform speaker recognition on a speech signal interval in which the first text 511 is uttered. According to a result of the speaker recognition on the speech signal interval, the electronic device 1000 may determine whether to perform, together with speech recognition, the speaker recognition for recognizing the first speaker with respect to speech signals acquired in the second interval 840.

When it is determined, as a result of the speaker recognition, that the first text 811 is uttered by the first speaker, the electronic device 1000 may perform both speech recognition and speaker recognition on the second speech signal acquired in the second interval 840. On the other hand, when it is determined that the first text 811 is not uttered by the first speaker, the electronic device 1000 may perform only speech recognition on the second speech signal acquired in the second interval 840 without performing speaker recognition thereon.

The second interval 840 during which both speaker recognition for the first speaker and speech recognition are performed may be set as a preset time interval following acquisition of speech signals in the first interval 830.

When it is determined that both speech recognition and speaker recognition are performed on the second speech signal acquired in the second interval 840, the electronic device 1000 may perform both speech recognition and speaker recognition on utterances 810 and 820 by the first and second speakers, which are acquired during the second interval 840. A fifth text 813 and a sixth text 822 may be obtained by a result of performing the speech recognition. The electronic device 1000 may determine that the fifth text 813 is uttered by the first speaker by performing the speaker recognition. Thus, the electronic device 1000 may extract a voice command from the first text 813 and perform an operation in response to the extracted voice command. Furthermore, because it is determined that the sixth text 822 is not uttered by the first speaker as a result of performing the speaker recognition, the electronic device 1000 may ignore a voice command corresponding to the sixth text 822 without executing the voice command.

The electronic device 1000 may detect in the sixth text 822 a second text 823 preset for performing speaker recognition for the second speaker. The second text 823 may be pre-registered by the second speaker. After the second text 823 is detected, the electronic device 1000 may perform both speech recognition and speaker recognition for the second speaker with respect to a speech signal subsequently acquired in a third interval 850.

For example, after the second text 823 is detected, speaker recognition may be performed for the second speaker who registered the second text 823. After the second text 823 is detected, the electronic device 1000 may acquire information necessary to perform speaker recognition for the second speaker.

Furthermore, when the second text 823 that is preset for performing the speaker recognition for the second speaker is detected in the sixth text 822, the electronic device 1000 may perform speaker recognition for the second speaker on a speech signal interval in which the second text 823 is uttered. According to a result of the speaker recognition on the speech signal interval, the electronic device 1000 may determine whether to perform, together with speech recognition, the speaker recognition for the second speaker with respect to the speech signal acquired in the third interval 850.

When it is determined, as a result of the speaker recognition, that the second text 823 is uttered by the second speaker, the electronic device 1000 may perform both speech recognition and speaker recognition on the speech signal acquired in the third interval 850. On the other hand, when it is determined that the second text 823 is not uttered by the second speaker, the electronic device 1000 may perform only speech recognition on the speech signal acquired in the third interval 850 without performing speaker recognition thereon.

The second interval 850 during which both speaker recognition for the first speaker and speech recognition are performed may be set as a preset time interval following acquisition of a speech signal in the first interval 830. Furthermore, the third interval 850 during which both speaker recognition for the second speaker and speech recognition are performed may be set as a preset time interval following acquisition of a speech signal corresponding to the second text 823. The second and third intervals 840 and 850 are not limited to the above examples and may be set in various ways.

When it is determined that both speech recognition and speaker recognition for the second speaker are performed on the speech signal acquired in the third interval 850, the electronic device 1000 may perform both speech recognition and speaker recognition on the utterances 810 and 820 by the first and second speakers, which are acquired during the third interval 850. Furthermore, the electronic device 1000 may perform speech recognition, speaker recognition for the first speaker, and speaker recognition for the second speaker on a speech signal acquired in a fourth interval 860 in which the second and third intervals 840 and 850 overlap each other.

As a result of performing the speech recognition, seventh and eighth texts 814 and 824 may be obtained in the fourth interval 860. By performing the speaker recognition for the first and second speakers, the electronic device 1000 may determine that seventh and eighth texts 814 and 824 are uttered by the first and second speakers. The electronic device 1000 may determine the order of priority for the first and second speakers and perform, according to the determined order of priority, an operation in response to a voice command corresponding to one of the seventh and eighth texts 814 and 824. For example, when the first speaker has a higher priority than the second speaker, the electronic device 1000 may preferentially perform a voice command corresponding to the seventh text 814 uttered by the first speaker. Furthermore, the electronic device 1000 may not execute a voice command corresponding to the eighth text 824 uttered by the second speaker.

The electronic device 1000 may perform both speaker recognition for the second speaker and speech recognition during an interval between T1 and T2 in the third interval 850 The electronic device 1000 may not perform speaker recognition for the first speaker. Ninth and tenth texts 815 and 825 may be obtained as a speech recognition result. The electronic device 1000 may determine that the tenth text 825 is uttered by the second speaker by performing speaker recognition for the second speaker. Thus, the electronic device 1000 may extract a voice command from the tenth text 825 and perform an operation in response to the extracted voice command. Furthermore, because it is determined that the ninth text 815 is not uttered by the second speaker, the electronic device 1000 may ignore a voice command corresponding to the ninth text 815 without executing the voice command.

According to an embodiment of the disclosure, speaker recognition may be performed on utterances spoken after detection of a preset text and not on all utterances during speech recognition, thereby reducing the amount of computation.

Furthermore, according to an embodiment of the disclosure, speaker recognition may be performed for a speaker who registered a preset text after detection of the preset text and not for all speakers, thereby increasing accuracy of the speaker recognition.

Embodiments may be implemented through computer-readable recording media having recorded thereon computer-executable instructions such as program modules that are executed by a computer. The computer-readable recording media may be any available media that can be accessed by a computer and include both volatile and nonvolatile media and both detachable and non-detachable media. Furthermore, the computer-readable recording media may include computer storage media and communication media. The computer storage media include both volatile and nonvolatile and both detachable and non-detachable media implemented by any method or technique for storing information such as computer-readable instructions, data structures, program modules, or other data. The communication media typically embody computer-readable instructions, data structures, or program modules, and include any information transmission media.

Furthermore, in the specification, the term "unit" may be a hardware component such as a processor or circuit and/or a software component that is executed by a hardware component such as a processor.

The above description of the disclosure is provided for illustration, and it will be understood by those of ordinary skill in the art that various changes in form and details may be readily made therein without departing from essential features and the spirit and scope of the disclosure as defined by the following claims. Accordingly, the above embodiments of the disclosure and all aspects thereof are examples only and are not limiting. For example, each component defined as an integrated component may be implemented in a distributed fashion. Likewise, components defined as separate components may be implemented in an integrated manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing speech recognition by an electronic device, the method comprising:
    detecting a first text, which is preset for performing speaker recognition, by performing speech recognition on a first speech signal;
    obtaining information of a first speaker corresponding the first text;
    performing speaker recognition based on a second speech signal acquired subsequently to the first speech signal and the information of the first speaker; and
    executing a function corresponding to the second speech signal, based on a speaker of the second speech signal corresponding to the first speaker by a result of the speaker recognition.

2. The method of claim 1, wherein the performing of the speaker recognition on the second speech signal comprises:
    acquiring, based on the first speech signal, a speech signal interval in which the first text is uttered,
    performing the speaker recognition on the speech signal interval, and
    performing the speaker recognition on the second speech signal, based on a result of performing the speaker recognition on the speech signal interval indicating that a speaker of the speech signal interval corresponds to the first speaker.

3. The method of claim 2,
    wherein the function corresponding to the second speech signal is executed based on whether a degree of correspondence between the speaker of the second speech signal and the first speaker is greater than or equal to a first reference value,
    wherein the speaker recognition is performed on the second speech signal based on whether a degree of correspondence between the speaker of the speech signal interval and the first speaker is greater than or equal to a second reference value, and
    wherein the first reference value is greater than the second reference value.

4. The method of claim 1, wherein the detecting of the first text comprises:
    performing named entity recognition on a text obtained by performing the speech recognition on the first speech signal,
    extracting a named entity representing the first speaker from the text by performing the named entity recognition, and
    detecting, as the first text, the named entity representing the first speaker.

5. The method of claim 1, wherein the second speech signal includes a speech signal acquired during a preset time period after acquisition of the first speech signal.

6. The method of claim 1, further comprising:
    ignoring the function corresponding to the second speech signal, based on a result of performing the speaker recognition on the second speech signal indicating that the speaker of the second speech signal does not correspond to the first speaker who registered the first text.

7. The method of claim 1, further comprising:
    detecting a second text, which is preset for performing speaker recognition, by performing speech recognition on a third speech signal acquired after the first speech signal;
    determining an order of priority for the first speaker and a second speaker who registered the second text, based on a result of performing the speaker recognition on a fourth speech signal indicating that a speaker of the fourth speech signal acquired after the third speech signal corresponds to the second speaker; and
    executing, based on at least one of the determined order of priority, or a voice command obtained from the fourth speech signal.

8. The method of claim 1, wherein the performing of the speaker recognition of the first speech signal and the second speech signal is based on analyzing signal characteristics comprising a waveform, a frequency, and an amplitude of the first speech signal and the second speech signal.

9. An electronic device for performing speech recognition, the electronic device comprising:
    a microphone configured to receive first and second speech signals; and
    at least one processor configured to:
        detect a first text, which is preset for performing speaker recognition, by performing speech recognition on the first speech signal,
        obtain information of a first speaker corresponding the first text,
        perform speaker recognition based on the second speech signal acquired subsequently to the first speech signal and the information of the first speaker, and
        execute a function corresponding to the second speech signal, based on a speaker of the second speech signal corresponding to the first speaker by a result of the speaker recognition.

10. The electronic device of claim 9, wherein the at least one processor is further configured to:
    acquire, based on the first speech signal, a speech signal interval in which the first text is uttered,
    perform the speaker recognition on the speech signal interval, and
    perform the speaker recognition on the second speech signal, based on a result of performing the speaker recognition on the speech signal interval indicating that a speaker of the speech signal interval corresponds to the first speaker.

11. The electronic device of claim 10, wherein the at least one processor is further configured to:
    execute the function corresponding to the second speech signal based on whether a degree of correspondence between the speaker of the second speech signal and the first speaker is greater than or equal to a first reference value, and
    perform the speaker recognition on the second speech signal based on whether a degree of correspondence between the speaker of the speech signal interval and the first speaker is greater than or equal to a second reference value, wherein the first reference value is greater than the second reference value.

12. The electronic device of claim 10, wherein the at least one processor is further configured to:
    perform named entity recognition on a text obtained by performing the speech recognition on the first speech signal, extract a named entity representing the first speaker from the text by performing the named entity recognition, and detect, as the first text, the named entity representing the first speaker.

13. The electronic device of claim 10, wherein the second speech signal comprises a speech signal acquired during a preset time period after acquisition of the first speech signal.

14. The electronic device of claim 10, wherein the at least one processor is further configured to:

ignore the function corresponding to the second speech signal, based on a result of performing the speaker recognition on the second speech signal indicating that the speaker of the second speech signal does not correspond to the first speaker who registered the first text.

15. The electronic device of claim 10, wherein the at least one processor is further configured to:

detect a second text, which is preset for performing speaker recognition, by performing speech recognition on a third speech signal acquired after the first speech signal, determine an order of priority for the first speaker and a second speaker who registered the second text, based on a result of performing the speaker recognition on the second speech signal indicating that a speaker of a fourth speech signal acquired after the third speech signal corresponds to the second speaker, and execute a voice command obtained from the fourth speech signal, based on the determined order of priority.

16. A computer program product comprising a non-transitory computer readable recording medium having recorded thereon a plurality of instructions, which when executed by at least one processor, instruct the at least one processor to perform:

detecting a first text, which is preset for performing speaker recognition, by performing speech recognition on a first speech signal;

obtaining information of a first speaker corresponding the first text;

performing speaker recognition based on a second speech signal acquired subsequently to the first speech signal and the information of the first speaker; and executing a function corresponding to the second speech signal, based on a speaker of the second speech signal corresponding to the first speaker by a result of the speaker recognition.

* * * * *